United States Patent [19]
Duny

[11] Patent Number: 5,221,822
[45] Date of Patent: Jun. 22, 1993

[54] LASER WORKING METHOD AND HEAD
[75] Inventor: Pierre G. Duny, Le Creusot, France
[73] Assignee: Framatome, Courbevoie, France
[21] Appl. No.: 819,977
[22] Filed: Jan. 13, 1992
[30] Foreign Application Priority Data
   Jan. 11, 1991 [FR] France ............... 91 00301
[51] Int. Cl.5 ............................... B23K 26/00
[52] U.S. Cl. .................... 219/121.63; 219/121.84
[58] Field of Search ................ 219/121.63, 121.64,
    219/121.67, 121.84, 121.67, 121.6, 121.73,
                                  121.74, 121.75

[56]         References Cited
       U.S. PATENT DOCUMENTS

| 5,066,846 | 11/1991 | Pirl ............................. | 219/121.63 |
| 5,097,110 | 3/1992 | Hamada et al. ................ | 219/121.63 |
| 5,117,086 | 5/1992 | Boudot et al. ................. | 219/121.64 |
| 5,132,508 | 7/1992 | Vignes et al. .................. | 219/121.63 |

FOREIGN PATENT DOCUMENTS

| 0294324 | 5/1988 | European Pat. Off. . |
| 0300458 | 1/1989 | European Pat. Off. . |
| 3637568 | 5/1988 | Fed. Rep. of Germany . |

*Primary Examiner*—C. L. Albritton
*Attorney, Agent, or Firm*—Pollock, Vande Sande & Priddy

[57]              ABSTRACT

A portion of the shielding gas of the welding is sent through passages (17) which traverse a copper block (16) mounted in the working head (1) beyond the reflecting mirror (8).

Application to the sleeving by laser welding of the tubes of steam generators of electro-nuclear power stations.

6 Claims, 1 Drawing Sheet

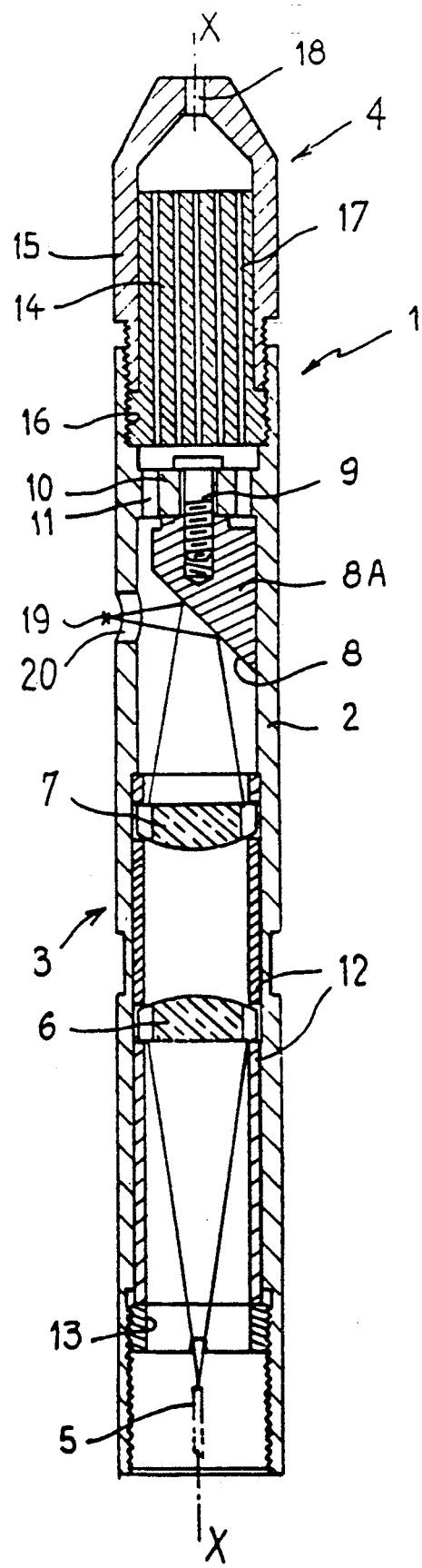

LASER WORKING METHOD AND HEAD

FIELD OF THE INVENTION

The present invention relates to laser working. It is applicable in particular to laser working inside small diameter tubes, for example the laser welding of repair sleeves inside tubes of a steam generator of a pressurized-water nuclear reactor.

BACKGROUND OF THE INVENTION

It has already been proposed to produce circular welds inside small diameter tubes by transporting a laser beam in a working head positioned inside the tube and by focusing this beam onto the working point after passing through a series of lenses and being reflected by a mirror inclined at 45°.

One of the difficulties encountered in this technique consists in obtaining an accurate focusing of the beam onto the working point despite the substantial heating of the working head in the vicinity of the reflecting mirror.

SUMMARY OF THE INVENTION

The object of the invention is to increase simply and economically the accuracy of the method.

For this purpose, the invention relates to a laser working method of the type in which a laser beam is transported inside a working head, reflected by an inclined mirror mounted in the latter and focused onto a working point, and a gas is sent into the region of the working head which contains the mirror, in which a portion of the gas is made to pass through passages provided in a thermally conductive solid part mounted beyond the mirror, in thermal contact solely with the casing of the working head and spaced from the holder of the mirror.

Preferably, between two working phases, gas continues to be passed through the passages of the solid part.

The invention also relates to a laser working head for carrying out such a method. This working head, of the type comprising a casing in which an optical system is mounted for transporting, focusing and reflecting a laser beam and comprises an inclined mirror, comprises a thermally conductive solid part mounted inside the casing beyond the mirror, in thermal contact solely with this casing and spaced from the holder of the mirror, this part being provided with passages which communicate with the space of the casing located on the side of the mirror remote from the solid part.

The passages of the working head are longitudinally provided in the solid part, which is made of a more thermally copper.

BRIEF DESCRIPTION OF THE DRAWING

An embodiment of the invention will now be described with reference to the attached drawing, the single FIGURE of which shows a longitudinal cross-section of a laser welding head according to the invention.

DESCRIPTION OF PREFERRED EMBODIMENT

The laser welding head 1 shown in the drawing is intended for carrying out one or more circular welds inside a small diameter tube (not shown), especially for attaching a repair sleeve inside a steam-generator tube of a water-pressurized nuclear reactor. The head 1, of general axis X—X, assumed vertical, comprises a generally tubular main casing 2 an optical system 3 mounted inside this casing and an upper nose 4. The outer diameter of the main casing is slightly less than the inner diameter of the tube, and this casing is provided with axial positioning and centring means, which are conventional and not shown, inside this tube.

The optical system 3 comprises, from the upstream end towards the downstream end, and optical fiber 5 which is terminated on the axis X—X, a collimating lens 6, a focusing lens 7 and a reflecting mirror 8 inclined at 45°. This mirror constitutes one face of a mirror-holder 8A which is fixed by means of a screw 9 to a transverse supporting partition 10 of the casing 2 traversed by openings 11, while the lenses 6 and 7 are positioned by means of bracing-sleeves 12 and by means of an annular clamping ring 13.

The nose 4 comprises a cooling part 14 and an ogive 15.

The cooling part 14 is a solid block made of copper, of generally cylindrical shape, whose lower portion, of increased diameter, is threaded and screwed into an internal thread 16 provided at the upper, open end of the casing 2. This block is traversed by a certain number of longitudinal conduits 17 emerging at its two end faces.

The ogive 15 covers the block 14, and its lower, threaded end is also screwed into the internal thread 16 until contacting the lower portion of the block 14. This ogive is provided at its end with a vent hole 18.

When the two elements 14 and 15 of the nose 4 are in place, the ogive 15 constitutes the end portion of the casing of the head 1, and the block 14 is separated away from the partition 10 towards the downstream end and is only in thermal contact with the parts 2 and 15 of the casing of the head.

In operation, the head 1 being positioned in the appropriate manner, the welding shielding gas is sent into the head, passes through notches provided on the edge of the lenses 6 and 7 and leaves the head towards the working point 19, through a window 20 of the casing 2 located opposite the mirror. However, a portion of this gas traverses the openings 11 of the partition 10, then the passages 17 of the part 14 and leaves the head via the vent 18.

The flow of gas being maintained, the welding laser beam is then transported via the optical fiber 5, collimated by the lens 6 and focused by means of the lens 7 onto the point 19 after reflection from the mirror 8.

Throughout the welding operation, which is intended to produce a circular weld and is carried out by causing the head 1 to rotate by one complete turn about its axis, the portion of the gas which traverses the openings 11 and the passages 17 and the conductive heat transfer between the casing 2 and the part 14 cause the heating, with priority, of this part 14 which is solid and has a high thermal conductivity, which limits the heating of the remainder of the head and especially of the mirror 8, the mirror-holder 8A and the supporting partition 10.

Between two welding operations, the flow of gas is maintained, which ensures accelerated cooling of the part 14 and also of the remainder of the head 1.

Thus, the heating of the parts of the head which are important for the quality of the weld is reduced during the welding and a rapid cooling is obtained between the welding operations. The thermal distortions of the head 1 are therefore reduced to a minimum.

I claim:

1. Laser working method of the type in which a laser beam is transported inside a working head (1), reflected by an inclined mirror (8) mounted in a region of said working head and focused onto a working point (19), and in which a gas is sent into said region of said working head which contains said mirror, including the step of passing a portion of the gas through passages (17) provided in a thermally conductive solid part (16) mounted beyond said mirror, in thermal contact solely with a casing (2, 15) of said working head and spaced from a holder (8A) of said mirror.

2. Method according to claim 1, wherein, between two working phases, gas continues to be passed through said passages (17) of said solid part (14).

3. Laser working head of the type comprising a casing (2, 15) in which an optical system (3) is mounted for transporting, focusing and reflecting a laser beam, and comprises an inclined mirror (8), wherein said laser working head further comprises a thermally conductive solid part (14) mounted inside said casing (2, 15) beyond said mirror (8), in thermal contact solely with said casing and spaced from a holder (8A) of said mirror, said solid part being provided with passages (17) which communicate with a space of said casing (2, 15) located on a side of said mirror remote from said solid part.

4. Working head according to claim 3, wherein said passages (17) extend longitudinally through said solid part (14).

5. Working head according to claim 3, wherein said solid part (14) is made of a more thermally conductive material than said casing (2, 15).

6. Working head according to claim 5, wherein said material is copper.

* * * * *